July 3, 1956  E. G. GAGE  2,752,999
AUTOMATIC CUTTING MACHINE
Filed Jan. 19, 1953  4 Sheets-Sheet 2
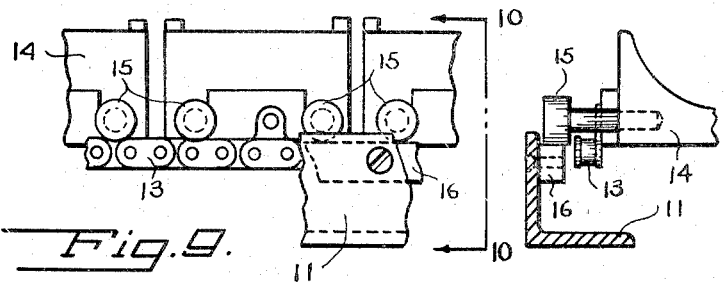
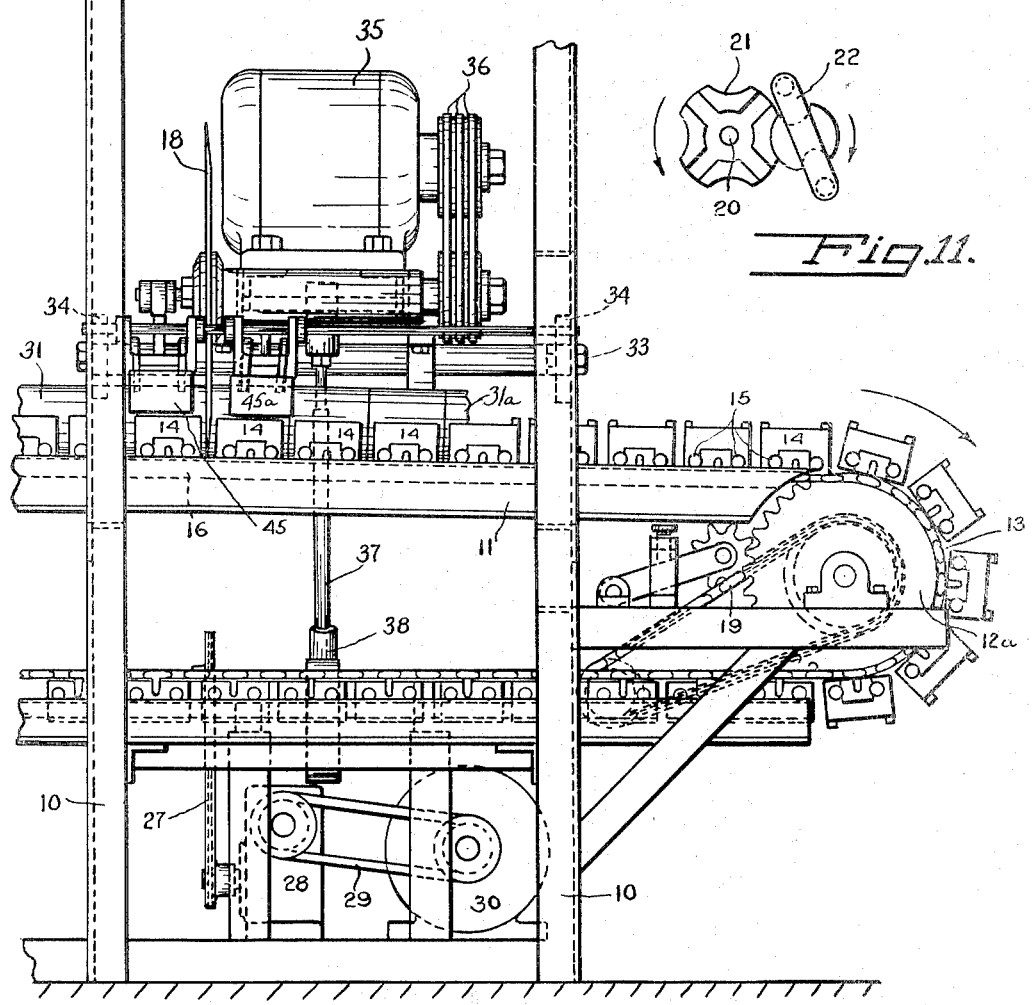
Fig.3.
INVENTOR.
EDWIN G. GAGE
BY Raymond A. Paquin
ATTORNEY.

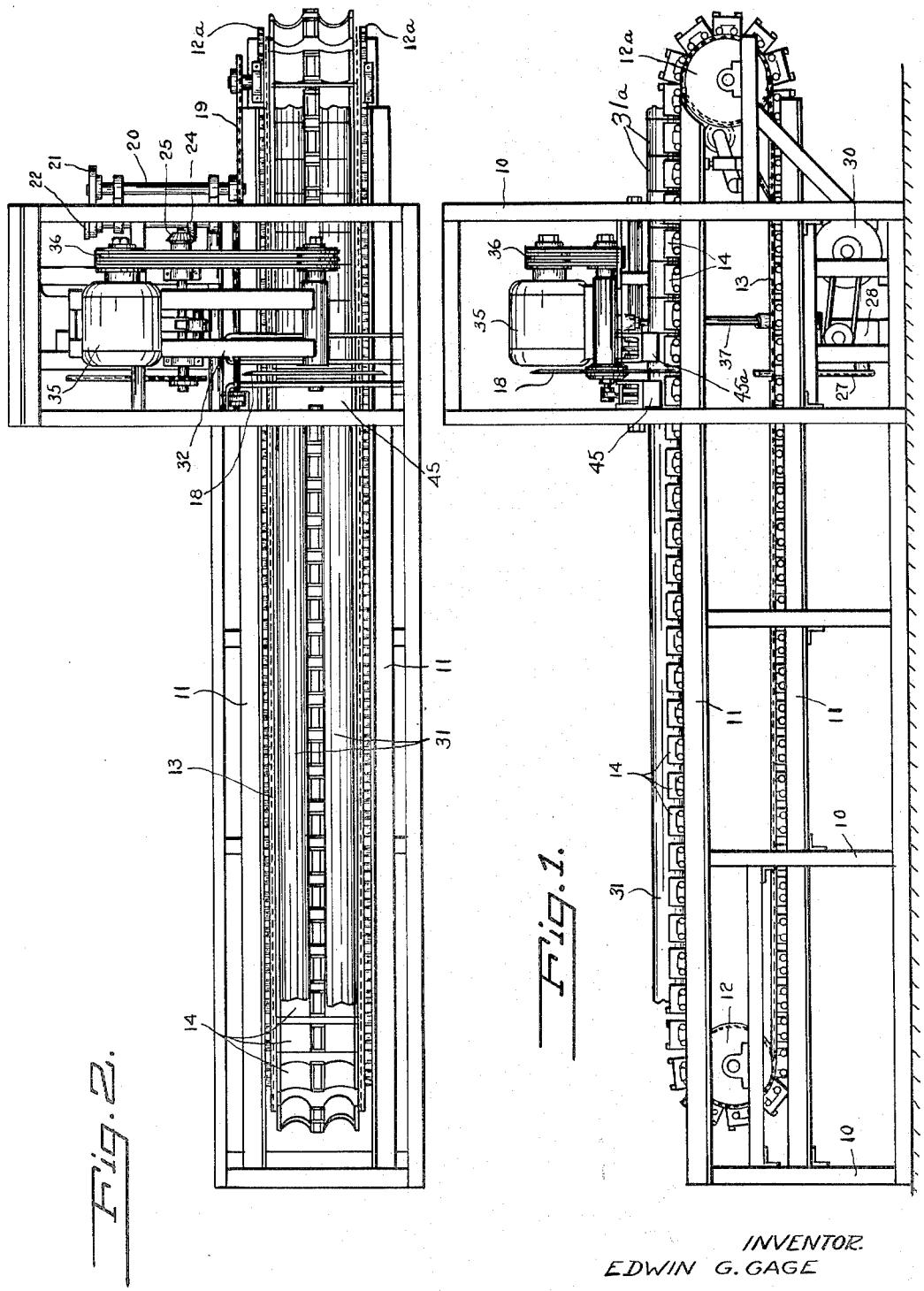

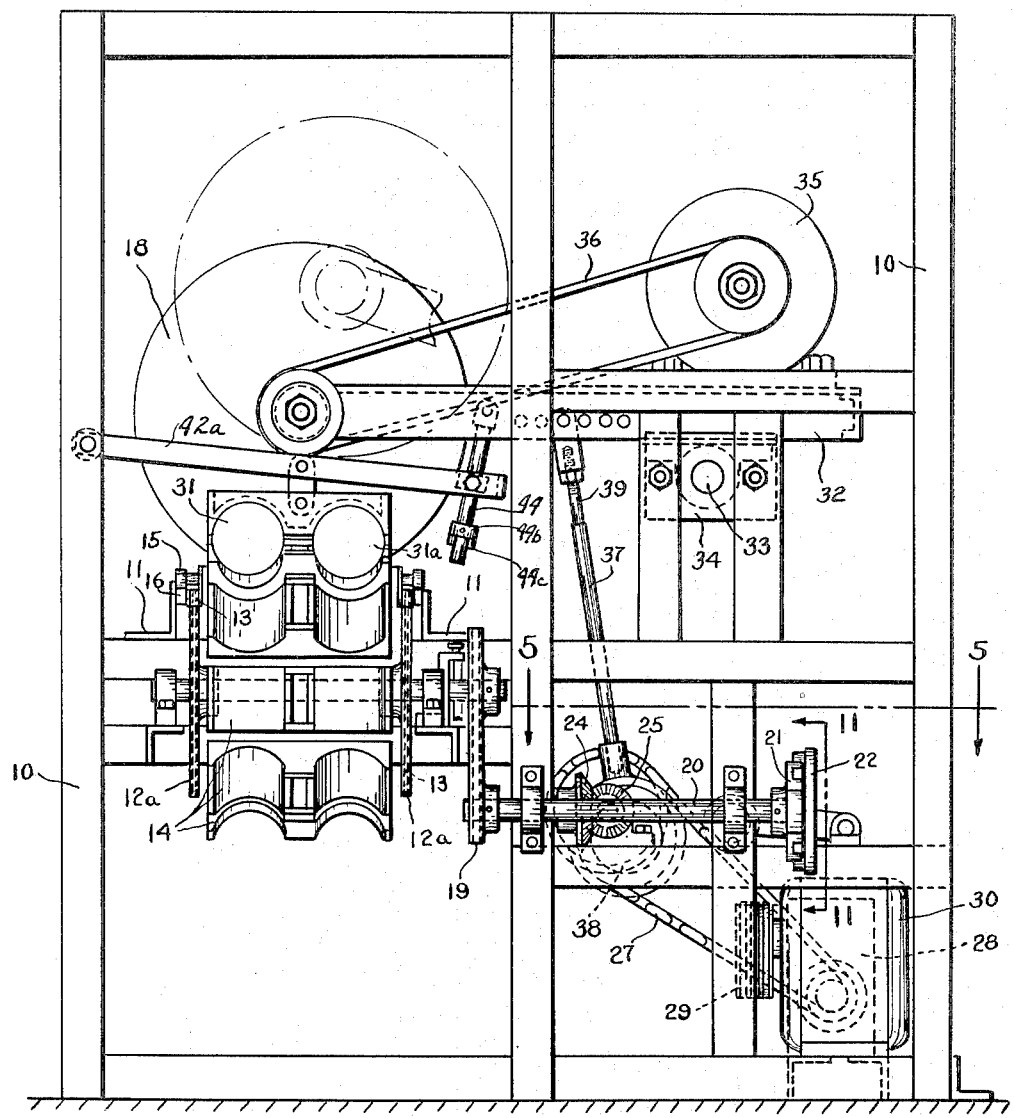

July 3, 1956 E. G. GAGE 2,752,999
AUTOMATIC CUTTING MACHINE
Filed Jan. 19, 1953 4 Sheets-Sheet 4
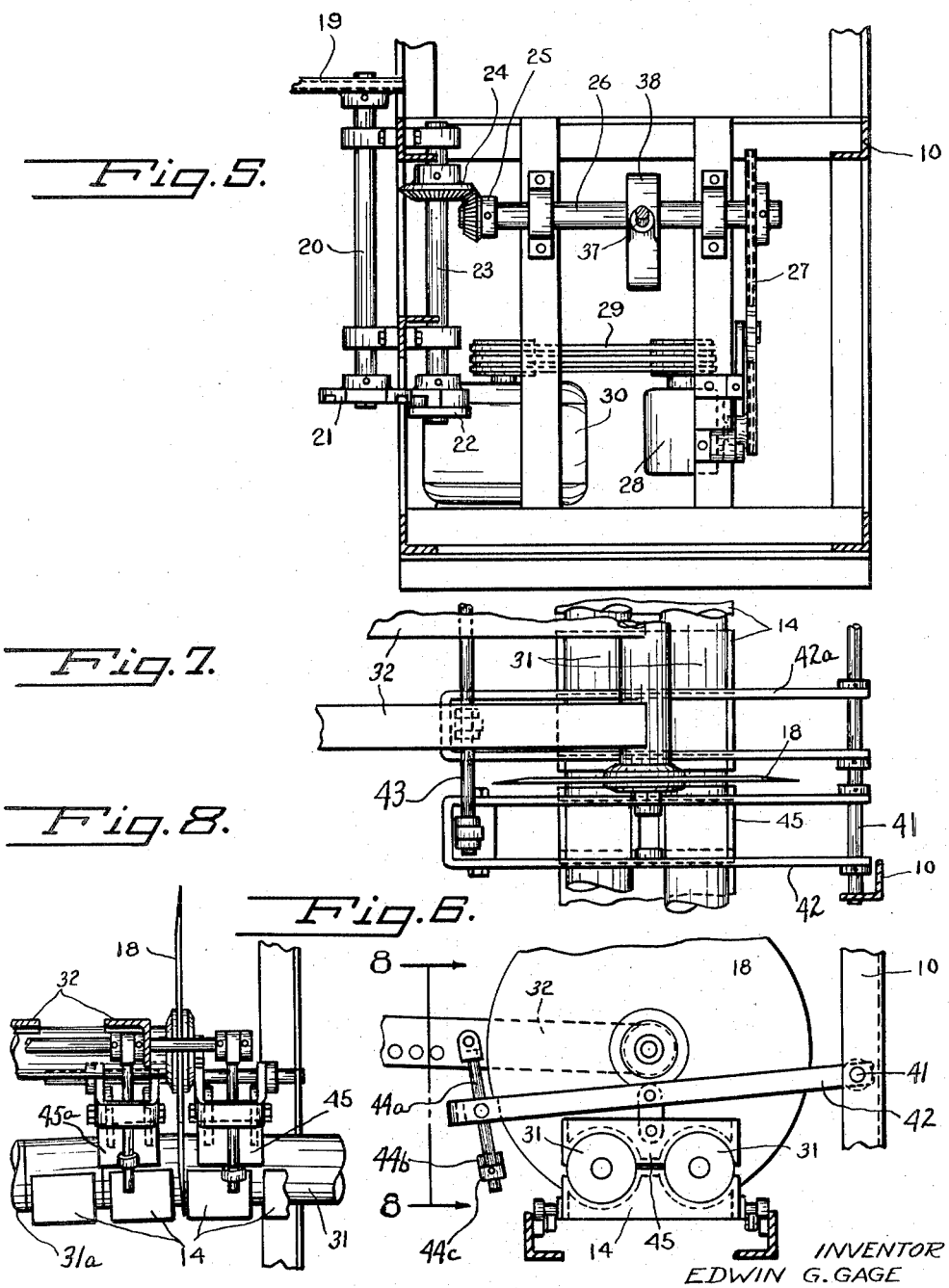
INVENTOR.
EDWIN G. GAGE
BY
ATTORNEY.

2,752,999

AUTOMATIC CUTTING MACHINE

Edwin G. Gage, Gilbertville, Mass., assignor to Gilbertville Woven Label Corporation, Gilbertville, Mass., a corporation of Massachusetts Application January 19, 1953, Serial No. 331,892

2 Claims. (Cl. 164—61)

This invention relates to automatic cutting apparatus and has particular reference to a new and improved apparatus for automatically cutting lengths of rolled paper or the like, known in the art as "logs," into sections of desired length.

An object of the invention is to provide a new and improved apparatus of the type set forth which is automatic and operates at greater speed without the errors encountered in cutting by hand.

Another object is to provide an apparatus of the type set forth which is relatively simple and economical in construction yet efficient in operation.

Another object is to provide an apparatus of the type set forth wherein the rolls are automatically positioned relative to the cutter and wherein the support for the section being cut is inclined relative to the main section of the roll, thus allowing the cutter or saw to cut through the roll without collapsing the section.

Other objects and advantages of the invention will be apparent from the following description taken in connection with the accompanying drawings. It will be understood that changes may be made in the details of construction and arrangement of parts without departing from the scope of the invention as set forth in the accompanying claims, as the preferred form has been given by way of illustration only.

Referring to the drawings:

Fig. 1 is a front view of an apparatus embodying the invention;

Fig. 2 is a top or plan view of the apparatus shown in Fig. 1;

Fig. 3 is a fragmentary view similar to Fig. 1, but on an enlarged scale;

Fig. 4 is an end view of the apparatus;

Fig. 5 is a fragmentary sectional view taken on line 5—5 of Fig. 4, looking in the direction of the arrows;

Fig. 6 is a fragmentary view showing the mechanism for holding the material to be cut during the cutting operation;

Fig. 7 is a top or plan view of the apparatus shown in Fig. 6;

Fig. 8 is a view taken on line 8—8 of Fig. 6, looking in the direction of the arrows;

Fig. 9 is a fragmentary view of the apparatus for feeding the material to be cut;

Fig. 10 is a sectional view taken on line 10—10 of Fig. 9; and

Fig. 11 is a fragmentary view of the drive mechanism.

Referring more particularly to the drawings wherein similar reference characters designate corresponding parts throughout, the apparatus comprises a frame comprising the uprights 10 and the horizontal supports 11 secured to the uprights 10.

Adjacent each end of the frame are provided a pair of sprockets 12 and 12a over which are positioned the endless chains or members 13 adapted to be driven by driven sprocket 12a.

Carried by the chains 13 are the spaced, hollow or recessed supporting members 14 on which are positioned the rollers 15 adapted to ride on the rails or tracks 16 on the support 11. The supports 14 are in pairs, that is, in side by side position with each pair of supporting members spaced from the next succeeding pair to allow clearance for the cutter during the cutting operation.

The sprocket 12a, which is the driven sprocket and which is adapted to effect movement of endless chains 13 and thereby effect movement of the supporting members 14 intermittently toward the cutter 18 and away from the cutter for delivery of the sections, is driven by chain drive 19 which is driven through shaft 20 on which is positioned Geneva wheel or gear 21 which is adapted to intermittently engage driving member 22 on shaft 23, which shaft carries the bevel gear 24 adapted to mesh with bevel gear 25 on shaft 26 which is driven by speed reducer 28 which is rotated by belts or the like 29 which are driven by motor 30.

Above the apparatus described for positioning the material 31 to be cut into sections of desired length, is positioned the cutting apparatus which comprises the cross frame 32 which is pivotally mounted on shaft 33 which is secured to blocks 34 which in turn are supported on the upright frame.

The cross head 32 carries the motor 35 and the rotatable cutter or splitting saw 18 which is adapted to be driven by the belt 36 and cross head 32 is adapted to be pivoted into and out of cutting position automatically by connecting rod 37 which is driven by the eccentric drive 38 on shaft 26. The connecting rod 37 has the adjustable portion 39 which may be secured to any of the openings or pivot centers 40 in the cross head 32 depending upon the amount of pivotal movement desired. The saw is preferably of the splitting saw type with the V edge on the side of the section to be cut.

The material to be cut is, as previously stated, in the form of "logs" formed of material such as thin or tissue paper wound on a hollow core and it is necessary that the material be retained in position during the cutting operation. For this reason the pivot or rod 41 is provided and on rod 41 is pivotally mounted support 42 for clamp 45 for holding the main log during the cutting operation and the support 42a for holding clamp 45a for holding the section to be cut. Cross head 32 is provided with rod 43 on which are supported depending pins 44 and 44a and having the adjustable stops 44b and 44c respectively. Blocks 45 and 45a are preferably of such weight that they will lower themselves and also retain the logs 31 in operative position during the cutting operation. If desired, additional weights could be provided to increase the effective weight of blocks 45 and 45a or, if desired, spring means or other suitable means could be employed for effecting additional weights or pressure on blocks 45 and 45a.

It will be noted that the relative positions of sprockets 12 and 12a is such that the supports 14 on the side of the cutter 18 toward sprocket 12a is inclined downwardly somewhat away from the cutter 18. This allows the portion of the log being cut to be separated from the portion being held during the cutting operation due to the shape of the cutter blade employed and prevents the collapse of the section being cut due to the pressure and shape of the cutter during the cutting operation, that is, it allows the section being cut to bend away from the main section of the log as the cutter progresses into the body of the log during the cutting operation.

It will be noted that because of the relative positions of the stops 44b and 44c controlling the positions of clamps 45a and 45 respectively, that the clamp 45 on the side of cutter 18 toward the logs 31 and which clamp retains the logs in cutting position, that such clamp 45 engages the upper surfaces of logs 31 prior to the starting of cutting of the logs by cutter 18. The clamp 45a on the other side of the saw, which clamp holds the section to be cut, does not engage the upper surface of the sections until the saw has cut in approximately an inch. It will also be noted that the surfaces of the two clamping portions 45 and 45a are substantially parallel to the upper surface of the supports 14 on which they are to operate and are at different angles because of the difference in the level of such supports on the opposite sides of saw 18.

In operation, the logs 31 to be cut are positioned on the supports 14, as shown in Figs. 1, 2, 3 and 4. The Geneva drive effects intermittent movement of the sprockets and during the time that the supporting members and sprockets are stationary, the cutting member effects a pivotal stroke and cutting operation which stroke is effected through the eccentric actuating member 38 and connecting rod 37 to cut off another section or sections from the log 31.

The chain drives 13 are advanced by sprocket 17 through the Geneva wheel arrangement intermittently, that is, step by step with each advance being equal to the distance between successive supports 14 thus, each of the supports 14 passing the cutter carries a cut section which is automatically removed from the supports 14 upon such supports passing over sprocket 12a when the supports are inverted.

During the cutting operation, the sections of the logs adjacent that to be cut are held firmly by the supporting block 45 which fits over the upper side of the logs 31, thus retaining them firmly in position for cutting and this block 45 is raised automatically upon each pivotal motion of cutter 18 and is also automatically lowered upon the surface of the logs 41 due to the force of gravity.

As previously described, the clamp 45 for retaining the log in position engages the log prior to the actual start of cutting by the saw. The clamp 45a does not engage the section 31a of the roll being cut until after the cutter has cut into the log.

As pointed out above and as shown particularly in Figs. 3 and 8, the relative positions of the supports 14 which carry the logs to be cut and the supports 14 on the opposite side of the saw are at different angles, that is, those sections carrying the cut portions 31a of the logs 31 are inclined downwardly away from the cutter to allow bending or tipping of the portion being cut by the cutter during the cutting operation and, thus preventing collapse of the section being cut due to the V shape of the cutter blade.

I claim:

1. A machine for cutting logs of paper or the like into sections, a support, an endless member forming a conveyor carried by said support and having a plurality of spaced portions, a rotary cutter mounted intermediate the ends of said conveyor and movable in a plane normal to said endless member, means for effecting relative movement of said endless member and cutter whereby said cutter will enter into the space between said supporting portions to cut material supported by said supporting portions, and means for intermittently advancing said endless member relative to said cutter between successive cutting operations, holding means for holding the material to be cut on said supporting portions during the cutting operation, and means for releasing said holding means upon movement of said cutter away from said endless member, said endless member being slightly inclined downwardly away from said cutter on the side thereof of the section being cut whereby the section being cut may tilt downwardly to avoid binding of the cutter in its kerf, said inclination beginning at the plane of said cutter and extending therefrom a sufficient distance to support a section during the cutting operation.

2. A machine for cutting logs of paper or the like into sections, a support, an endless conveyor carried by said support and comprising a plurality of spaced supporting portions, a rotary cutter movable in a plane normal to the plane of said conveyor, means for effecting intermittent alternate motion of said endless conveyor, to progress said log along the machine, and said cutter, whereby said cutter will cut material supported by said supporting portions, said supporting portion for the section being cut being slightly inclined downwardly away from said cutter on the side thereof of the section being cut, the degrees of inclination being no more than that required to prevent binding so that the section being cut will be firmly supported especially at the end of the cutting operation.

References Cited in the file of this patent

UNITED STATES PATENTS

| | | |
|---|---|---|
| 379,893 | Hipperling | Mar. 20, 1888 |
| 439,479 | Cox | Oct. 28, 1890 |
| 494,819 | Mesta | Apr. 4, 1898 |
| 859,537 | Ballard | July 9, 1907 |
| 1,382,207 | McGuire | June 21, 1921 |
| 1,510,729 | Weisner | Oct. 7, 1924 |
| 1,589,784 | Bates | June 22, 1926 |
| 1,891,524 | Capocefalo | Dec. 20, 1932 |
| 2,232,487 | Smith | Feb. 18, 1941 |
| 2,261,837 | Allen | Nov. 4, 1941 |
| 2,293,721 | Engler | Aug. 25, 1942 |
| 2,586,903 | Badenhausen et al. | Feb. 26, 1952 |
| 2,610,688 | Overman | Sept. 16, 1952 |
| 2,619,176 | Pearson | Nov. 25, 1952 |